June 30, 1931.  F. W. RABE  1,812,170
REFRIGERATING APPARATUS
Filed Sept. 13, 1929
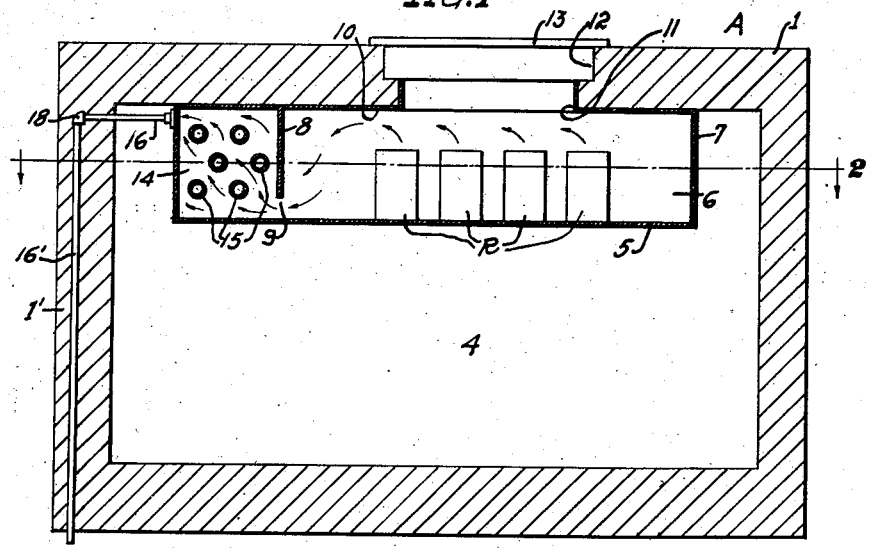
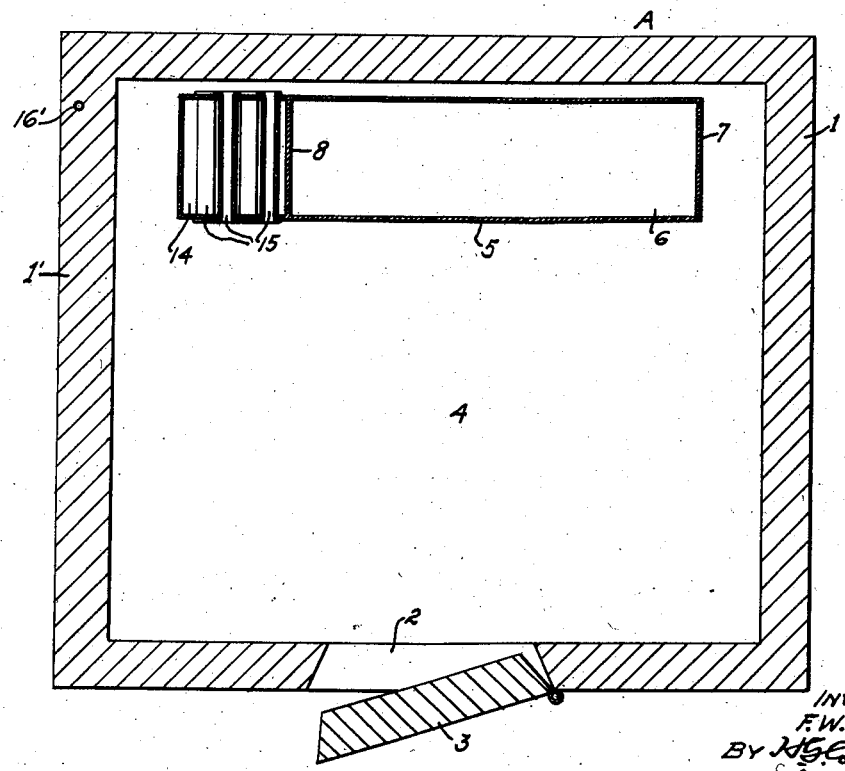
INVENTOR
F. W. RABE
BY J.G.Cook
ATTORNEY Patented June 30, 1931

1,812,170

UNITED STATES PATENT OFFICE

FREDERICK W. RABE, OF ST. LOUIS, MISSOURI, ASSIGNOR TO ANHEUSER-BUSCH, INC., OF ST. LOUIS, MISSOURI, A CORPORATION OF MISSOURI

REFRIGERATING APPARATUS

Application filed September 13, 1929. Serial No. 392,289.

This invention relates generally to refrigerating apparatus, and more specifically to refrigerating apparatus adapted for use with solid carbon dioxide ($CO_2$), or other solidified gas, as the refrigerant thereof, the predominant object of the invention being to produce a refrigerating apparatus of this type which is so constructed and arranged that the maximum refrigerating efficiency of the refrigerant is obtained.

It is generally known that solid carbon dioxide at atmospheric conditions attains a temperature of approximately 110 degrees below zero, Fahrenheit, and it is likewise common knowledge that said substance is dissipated by sublimation, during which sublimation a gas is given off thereby. This gas at the moment it leaves the solid carbon dioxide is approximately the same temperature as the body of solid carbon dioxide, and hence the gas possesses high refrigerating value.

In the use of some refrigerating apparatus employed prior to this invention in the utilization of solid carbon dioxide as a refrigerant, the refrigerating value of the gas given off by the refrigerant was partially or entirely lost, and the primary object of this invention is to utilize the refrigerating value of this gas until all of said refrigerating value has been dissipated, whereby the efficiency of the refrigerating apparatus will be increased.

Fig. 1 is a vertical section through a refrigerating apparatus constructed in accordance with this invention.

Fig. 2 is a horizontal section taken on line 2—2 of Fig. 1.

In the drawings, wherein is shown for the purpose of illustration, merely, one embodiment of the invention, A designates my improved refrigerating apparatus, which comprises a housing 1 provided with suitable insulated walls of the type common to refrigerators, said walls being lined with cork, kapok, or other suitable porous material. The housing 1 is provided with an opening 2 with which is associated a suitable closure element 3, said opening 2 providing for access to the refrigerated compartment 4 within the housing 1.

Supported in any suitable manner within the refrigerated compartment 4, preferably in the upper portion thereof, is a refrigerant receptacle 5, said receptacle comprising a container formed of sheet metal or other suitable material. The greater portion of the receptacle 5 constitutes a refrigerant receiving compartment 6, the bottom and side walls of said compartment being provided by the bottom and side walls of the receptacle 5, and the opposite end walls of said compartment being provided by an end wall 7 of the receptacle 5 and a vertically disposed partition or baffle plate 8. The partition or baffle plate 8 does not extend entirely to the bottom wall of the receptacle 5, the lower edge of said partition or baffle plate being spaced apart in a vertical direction from said bottom wall of the receptacle to provide a passageway 9. The refrigerant receiving compartment 6 is provided with a top wall 10 through which an opening 11 is formed, said opening 11 being arranged in coincidence with an opening 12 formed in the top wall of the housing 1, and the last mentioned opening is closed by a removable closure element 13.

At the side of the partition or baffle plate 8 opposite to the side thereof at which the refrigerant receiving compartment 6 is located, the receptacle 5 is provided with a compartment 14 with which the refrigerant receiving compartment 6 communicates through the instrumentality of the passageway 9. Extended transversely of the compartment 14 is a nest of tubular elements 15 providing flues, said tubular elements being secured at their opposite ends to the opposite side walls of the compartment 14, and the opposite ends of said tubular elements being open so that air within the refrigerated compartment 4, with which said tubular elements communicate, may pass therethrough.

Leading from the compartment 14 is a gas conductor 16 communicating with the interior of the compartment 14, preferably at the top portion thereof. The conductor 16 preferably extends through a wall of the refrigerated compartment 4 and serves to discharge gas from the compartment 14 to atmosphere.

In the use of my improved refrigerating apparatus the closure element 13 will be removed and blocks of solid carbon dioxide, or other solidified gas, R will be introduced into the refrigerant receiving compartment 6 through the openings 11 and 12 in the top walls of the compartment 6 and housing 1, after which the closure element will be replaced so that it will close said openings. The refrigerant, when same is solid carbon dioxide, will be approximately 110 degrees below zero, Fahrenheit, and as a result thereof the temperature of the refrigerated compartment 4 will be very much reduced. During the reduction of the temperature of the refrigerated compartment 4 the refrigerant R will sublimate, and a gas will be given off thereby which is heavier than air, and this gas will move downwardly within the compartment 6 and will pass through the passageway 9 into the compartment 14, said gas passing between and around the tubular elements 15 and being discharged from the compartment 14 through the conductors 16 and 17, as indicated by the arrows in Fig. 1.

When the gas referred to leaves the refrigerant R it is approximately the same temperature as said refrigerant, hence said gas possesses substantial refrigerating value, and by passing said gas through the compartment 6 in contact with the tubular elements 15 the temperature of the tubular elements will be reduced to and maintained at a temperature which approximates the temperature of the gas. The tubular elements 15 are located at the top of the refrigerated compartment 4, at which point the warmer air of the circulating air within said refrigerated compartment is located, and some of this warmer air will pass longitudinally through the tubular elements 15, whereby the temperature of such air will be reduced. It is my belief that this passage of air through the tubular elements 15 results from the fact that the downward movement of air which has been chilled by the receptacle 5 creates suction at the ends of the tubular elements which draws air through said tubular elements. In this manner there is a continued circulation of air within the refrigerated compartment 4 through the very cold tubular elements 15, and as a result thereof the temperature within said refrigerated compartment is maintained at a lower temperature than would be the case in the absence of the tubular elements.

In passing through the compartment 6 between and around the tubular elements 15, the refrigerating value of the gas will be substantially dissipated, and said gas passes from the compartment 6 through the conductor 16 and is discharged to atmosphere.

It is plain, therefore, that the gas resulting from the sublimation of the refrigerant is not released until substantially all of the refrigerating value thereof has been dissipated, whereby loss of refrigerating value in the gas is avoided.

I claim:

1. A refrigerating apparatus comprising a housing providing a refrigerated compartment, a refrigerant chamber within said refrigerated compartment arranged to receive a refrigerant of the solidified gas type which gives off gas on sublimation, a gas chamber disposed adjacent to said refrigerant chamber and likewise located within said refrigerated compartment, said gas chamber being in communication with said refrigerant chamber whereby gas resulting from sublimation of the refrigerant may pass from the refrigerant chamber into the gas chamber, means for discharging gas from said gas chamber, a conduit extended through said gas chamber and disposed in the path of gas moving therethrough, said conduit being arranged in communication with said refrigerated compartment so as to provide a passageway for air within said refrigerated compartment.

2. A refrigerating apparatus comprising a housing providing a refrigerated compartment, a refrigerant chamber within said refrigerated compartment arranged to receive a refrigerant of the solidified gas type which gives off gas on sublimation, a gas chamber disposed adjacent to said refrigerant chamber and likewise located within said refrigerated compartment, said gas chamber being in communication with said refrigerant chamber whereby gas resulting from sublimation of the refrigerant may pass from the refrigerant chamber into the gas chamber, means for discharging gas from said gas chamber, a plurality of conduits extended through said gas chamber and disposed in the path of travel of gas moving therethrough so that said gas will pass between and around said conduits, said conduits being arranged in communication with said refrigerated compartment so as to provide passageways for air within said refrigerated compartment.

3. A refrigerating apparatus comprising a housing providing a refrigerated compartment, a refrigerant chamber within said refrigerated compartment arranged to receive a refrigerant of the solidified gas type which gives off gas on sublimation, a gas chamber disposed adjacent to said said refrigerant chamber and likewise located within said refrigerated compartment, said gas chamber being in communication with said refrigerant chamber whereby gas resulting from sublimation of the refrigerant may pass from the refrigerant chamber into the gas chamber, a baffle for causing gas from the refrigerant chamber to pass into the gas chamber at a predetermined point thereof, means for discharging gas from said gas chamber, a conduit extended through said gas chamber and disposed in the path of travel of gas moving therethrough, said conduit being arranged in comunication with said refrigerated compartment so as to provide a passageway for air within said refrigerated compartment.

4. A refrigerating apparatus comprising a housing providing a refrigerated compartment, a refrigerant chamber within said refrigerated compartment arranged to receive a refrigerant of the solidified gas type which gives off gas on sublimation, a gas chamber disposed adjacent to said refrigerant chamber and likewise located within said refrigerated compartment, said gas chamber being in communication with said refrigerant chamber whereby gas resulting from sublimation of the refrigerant may pass from the refrigerant chamber into the gas chamber, a baffle for causing gas from the refrigerant chamber to pass into the gas chamber at a predetermined point thereof, means for discharging gas from said gas chamber, a nest of conduits extended through said gas chamber and disposed in the path of travel of gas moving therethrough so that said gas will pass between and around said conduits, said conduits being arranged in communication with said refrigerated compartment so as to provide passageways for air within said refrigerated compartment.

5. A refrigerating apparatus comprising a housing providing a refrigerated compartment, a refrigerant chamber within said refrigerated compartment arranged to receive a refrigerant of the solidified gas type which gives off gas on sublimation, a gas chamber disposed adjacent to said refrigerant chamber and likewise located within said refrigerated compartment, said gas chamber being in communication with said refrigerant chamber whereby gas resulting from sublimation of the refrigerant may pass from the refrigerant chamber into the gas chamber, means for discharging gas from said gas chamber comprising a conductor extended into a wall of said housing, a conduit extended through said gas chamber and disposed in the path of travel of gas moving therethrough, said conduit being arranged in communication with said refrigerated compartment so as to provide a passageway for air within said refrigerated compartment.

In testimony that I claim the foregoing I hereunto affix my signature.

FREDERICK W. RABE.